United States Patent
Yasutake et al.

(10) Patent No.: US 12,215,741 B2
(45) Date of Patent: Feb. 4, 2025

(54) MOTION GUIDANCE DEVICE

(71) Applicant: THK CO., LTD., Tokyo (JP)

(72) Inventors: Hiroyoshi Yasutake, Tokyo (JP); Ryuji Furusawa, Tokyo (JP); Ryunosuke Ozeki, Tokyo (JP); Ryosuke Maruki, Tokyo (JP)

(73) Assignee: THK CO., LTD., Tokyo (JP)

( * ) Notice: Subject to any disclaimer, the term of this patent is extended or adjusted under 35 U.S.C. 154(b) by 108 days.

(21) Appl. No.: 18/014,666

(22) PCT Filed: Jul. 5, 2021

(86) PCT No.: PCT/JP2021/025298
§ 371 (c)(1),
(2) Date: Jan. 5, 2023

(87) PCT Pub. No.: WO2022/009831
PCT Pub. Date: Jan. 13, 2022

(65) Prior Publication Data
US 2023/0258232 A1 Aug. 17, 2023

(30) Foreign Application Priority Data
Jul. 9, 2020 (JP) .................................. 2020-118184

(51) Int. Cl.
*F16C 29/06* (2006.01)
(52) U.S. Cl.
CPC .................................. *F16C 29/06* (2013.01)
(58) Field of Classification Search
CPC ............. F16C 29/0609; F16C 29/0633; F16C 33/66–6692
See application file for complete search history.

(56) References Cited

U.S. PATENT DOCUMENTS

| | | |
|---|---|---|
| 11,905,990 B2 * | 2/2024 | Yu ........................ F16C 33/6629 |
| 2009/0304312 A1 | 12/2009 | Horie et al. |
| 2015/0125100 A1 * | 5/2015 | Hsieh .................. F16C 29/0609 |
| | | 384/13 |

FOREIGN PATENT DOCUMENTS

JP 5160239 B2 3/2013

OTHER PUBLICATIONS

International Search Report dated Aug. 17, 2021, issued in counterpart International Application No. PCT/JP2021/025298. (2 pages).

* cited by examiner

*Primary Examiner* — James Pilkington
*Assistant Examiner* — Aimee Tran Nguyen
(74) *Attorney, Agent, or Firm* — WHDA, LLP

(57) ABSTRACT

A guide device includes a track member and a moving member with rolling elements interposed therebetween. A lubricating path is formed in the moving member for supplying lubricant to a circulation path for the rolling elements. The lubricating path has a common path including an inlet portion that serves as a supply port for the lubricant, a first path through which grease flows, and a second path through which lubricating oil flows. A cross-sectional area of the second path is smaller than a cross-sectional area of the first path, and in the common path, a second communication portion of the second path is located closer to the inlet portion than a first communication portion of the first path. Further, the guide device includes a plug member for blocking the inlet portion of the common path, the plug member being removable and able to be moved within the common path.

5 Claims, 7 Drawing Sheets

[Fig. 1]
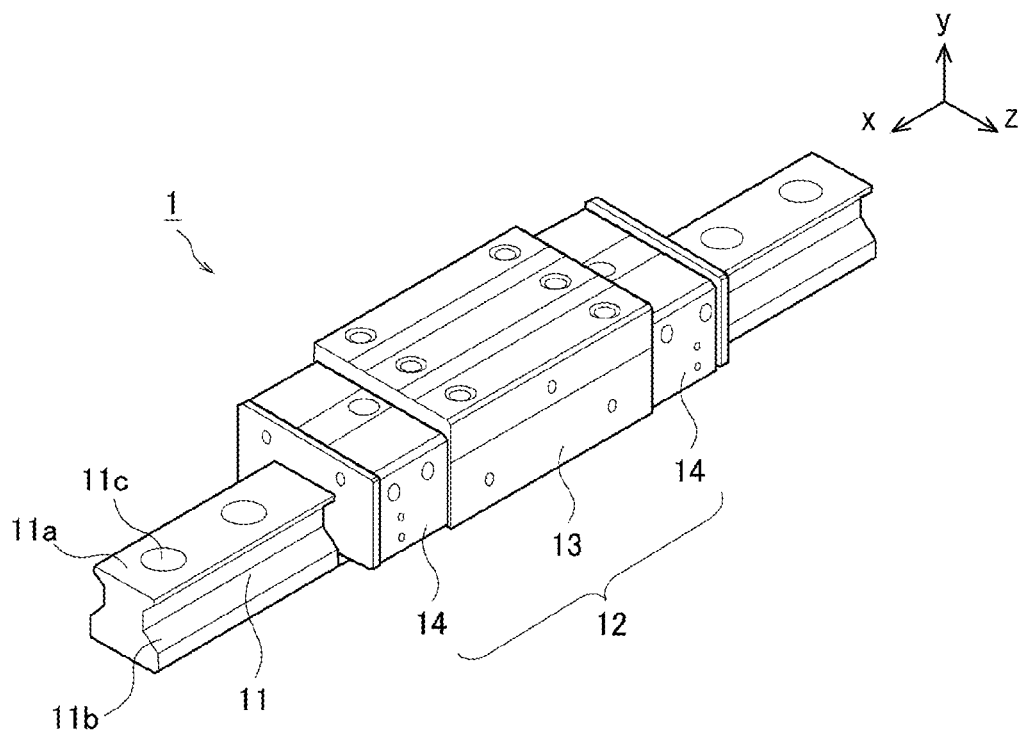
[Fig. 2]
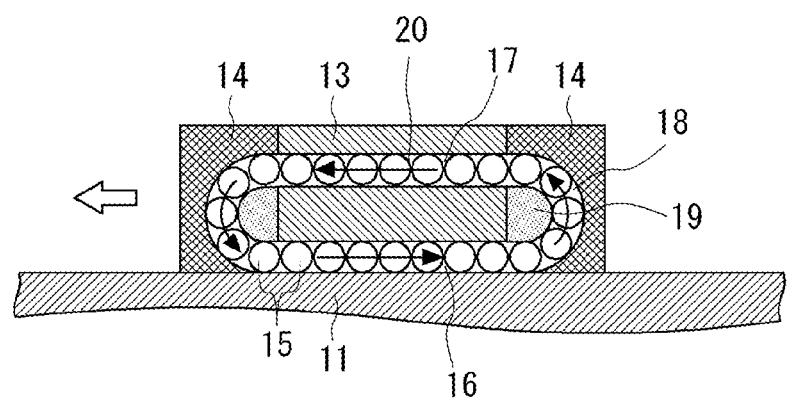

[Fig. 3]
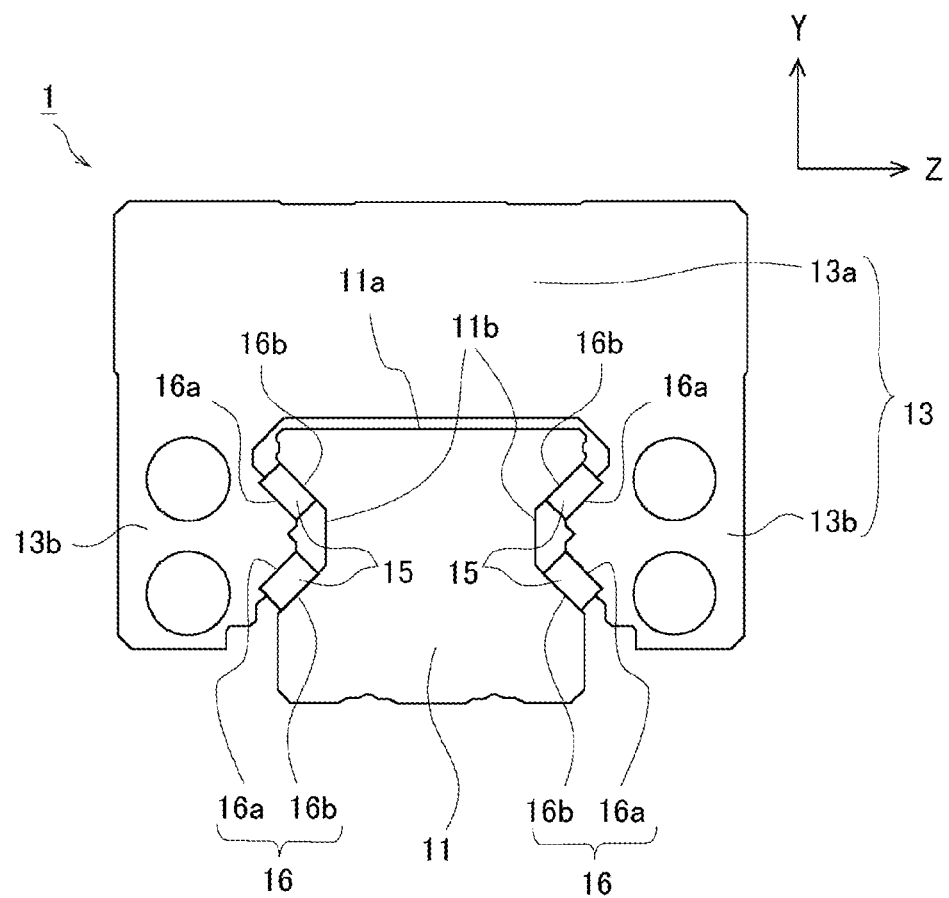

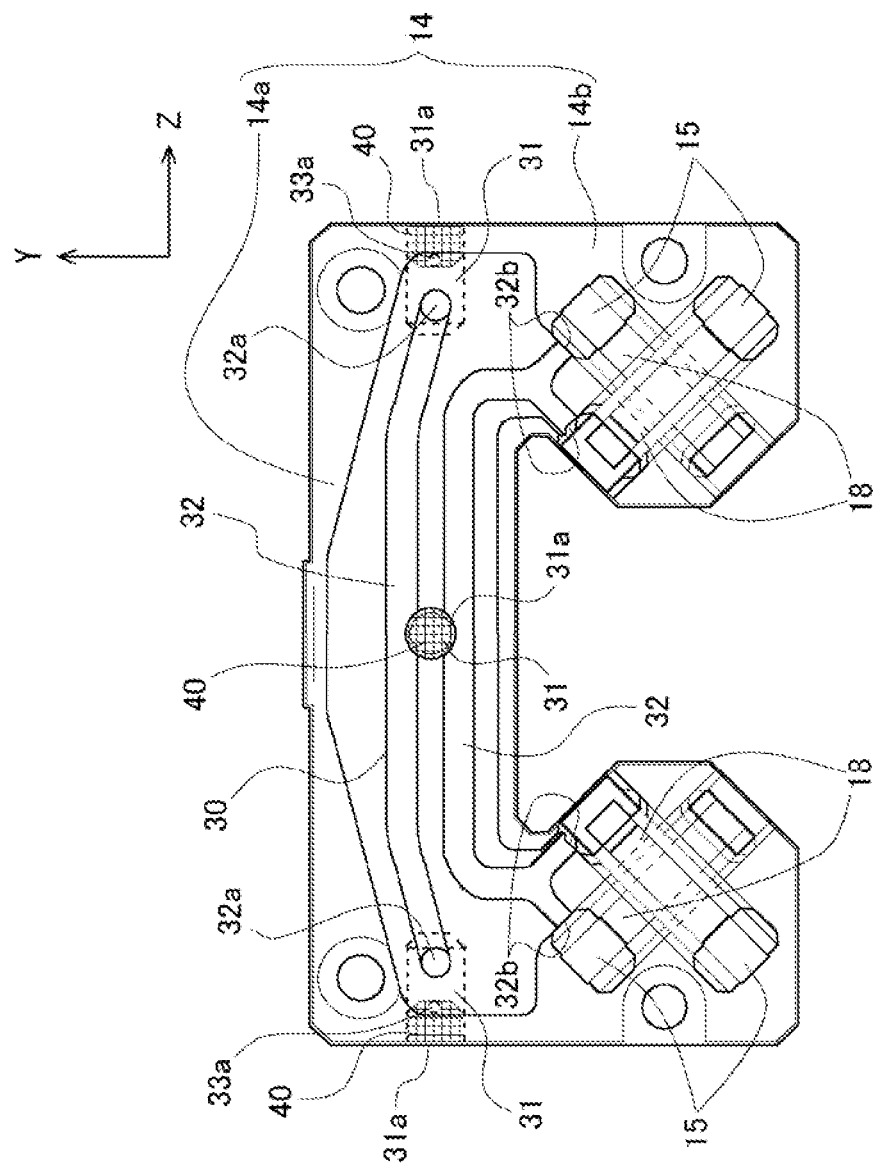
[Fig. 4]

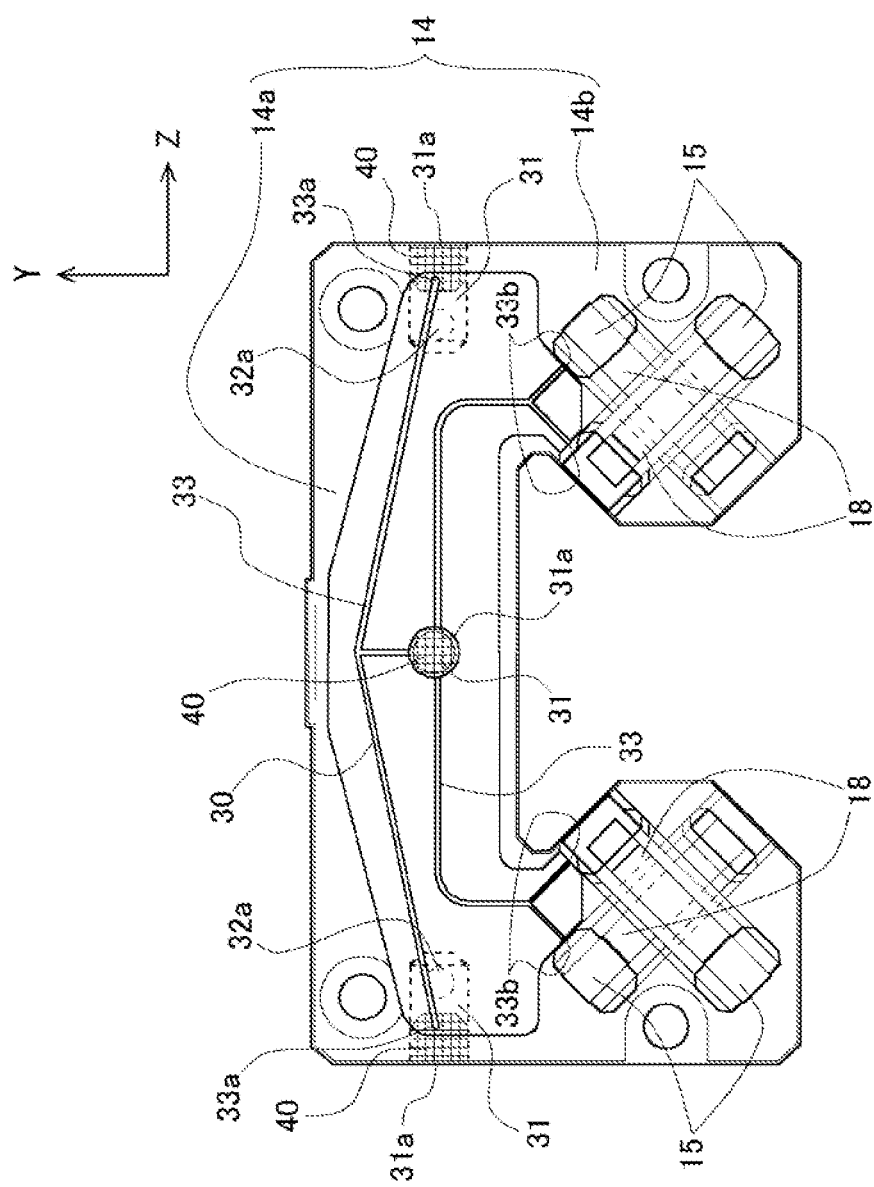

[Fig. 6]
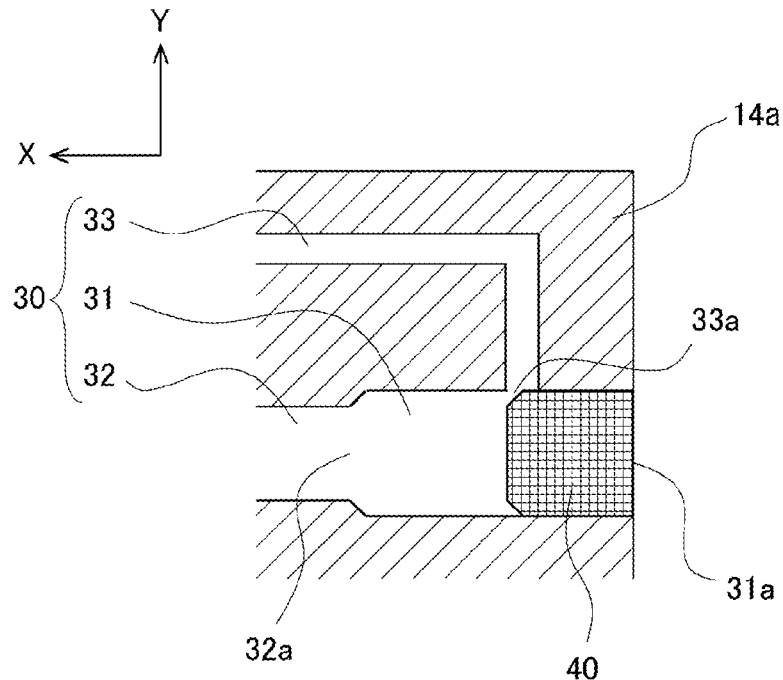
[Fig. 7]
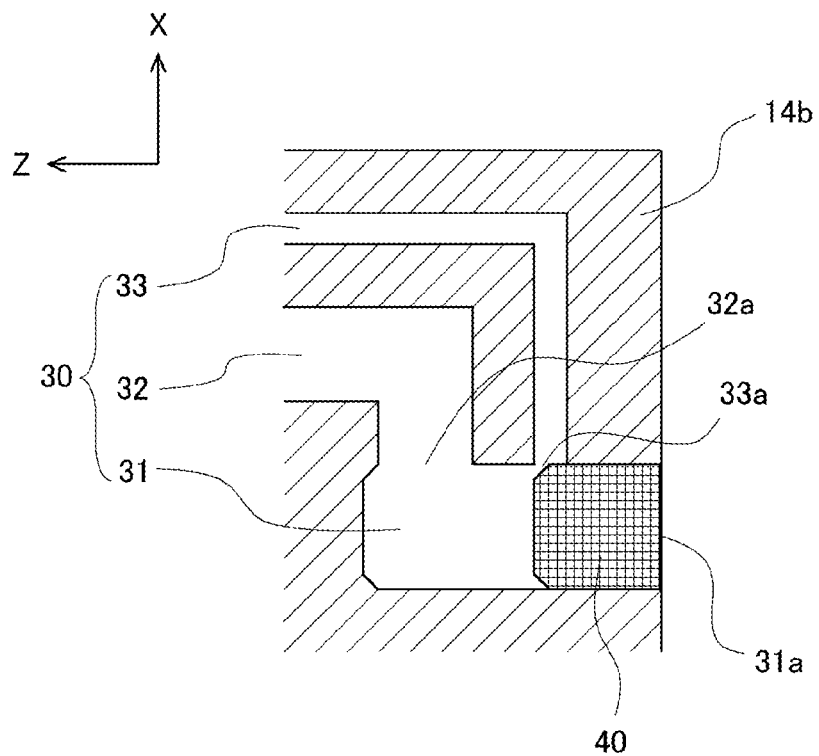

[Fig. 8]
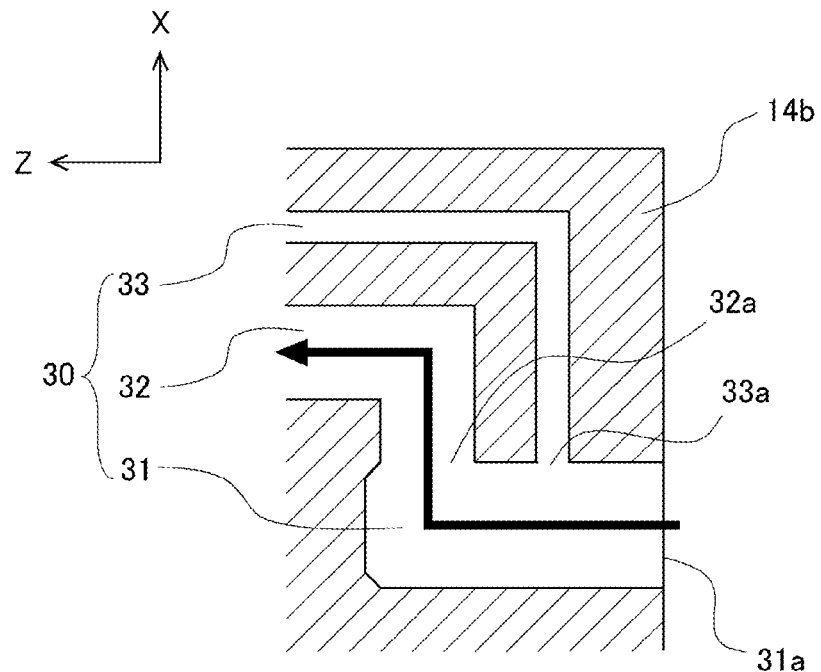
[Fig. 9]
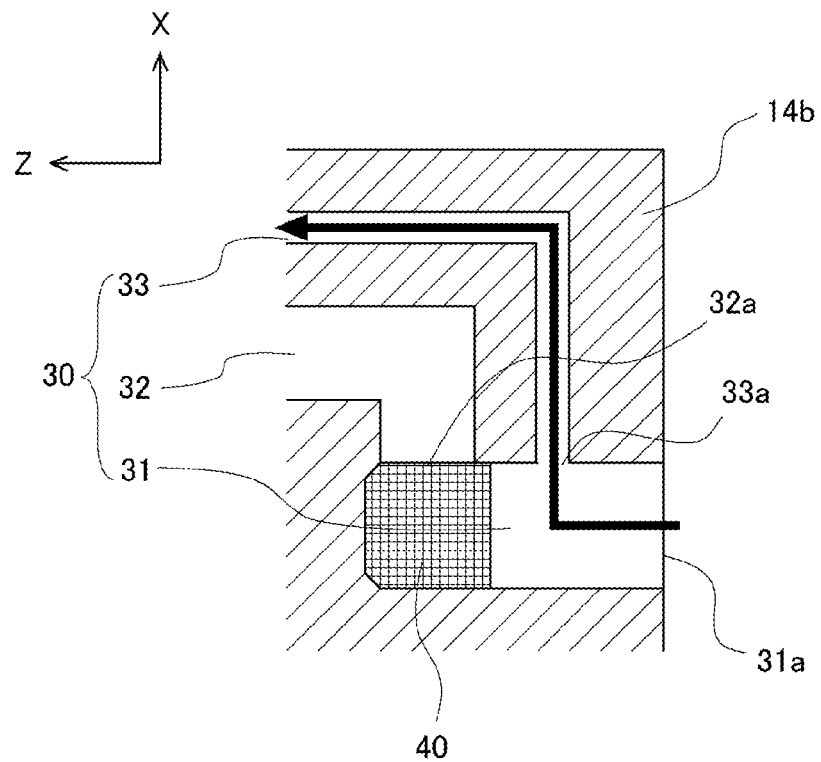

[Fig. 10]
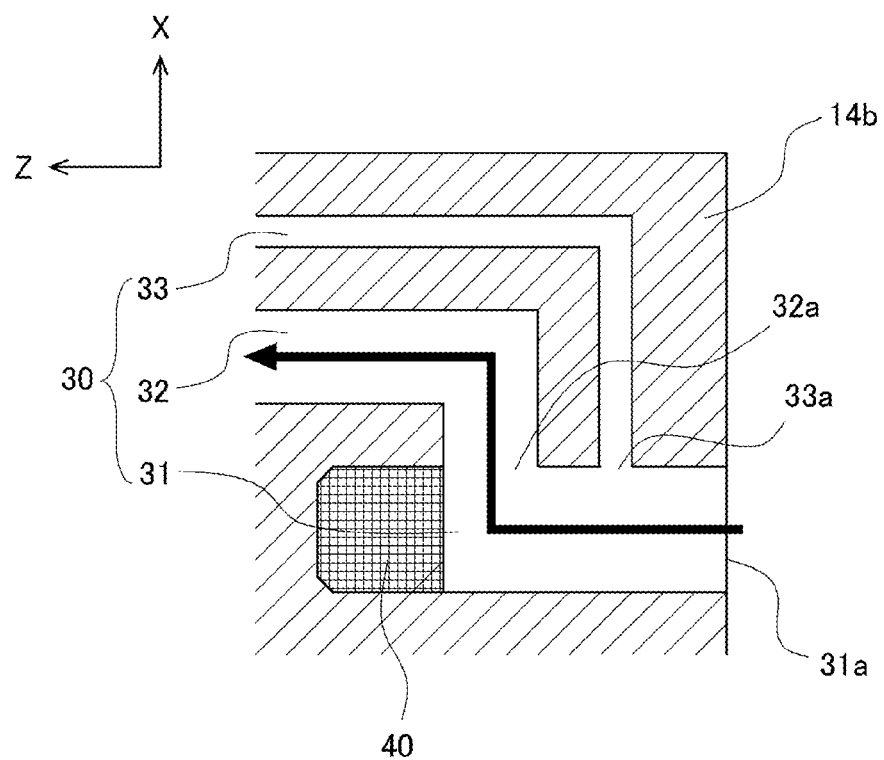

MOTION GUIDANCE DEVICE

TECHNICAL FIELD

The present invention relates to a guide device in which a moving member moves relative to a track member.

BACKGROUND ART

Conventionally, there has been known a guide device that includes a track member extending along a longitudinal direction, and a moving member capable of relatively moving along the longitudinal direction of the track member. In such a guide device, the moving member is engaged with the track member in such a manner that a plurality of rolling elements are rollably sandwiched between mutually opposed rolling surfaces formed on the track member and the moving member, respectively. Thus, a loaded rolling path where the plurality of rolling elements roll is defined between the rolling surface of the track member and the rolling surface of the moving member. Further, inside the moving member, there is formed a circulation path that is in communication with the loaded rolling path for circulating the plurality of rolling elements. When the moving member moves along the longitudinal direction of the track member, the rolling elements circulate through the loaded rolling path and the circulation path. Hereinafter, a path, which is formed by the loaded rolling path and the circulation path and through which the rolling elements circulate, is referred to as a "rolling element path".

Here, in the guide device having the above configuration, it is necessary to supply lubricant to the rolling element path in order to suppress wear of the wall surface of the rolling element path (i.e., the rolling surface or the wall surface of the circulation path) and the rolling elements when the rolling elements circulate in the rolling element path. As the lubricant used in the guide device, grease (semi-solid lubricant) and lubricating oil (liquid lubricant) are generally known. Grease and lubricating oil are used differently depending on the use environment of the guide device.

In addition, Patent Literature 1 discloses a motion guide device with a lubrication path. The lubrication path is a path through which lubricant supplied to a rolling element circulation path flows. In this Patent Literature 1, the motion guide device is provided with a lubrication path piece in which a lubrication path groove constituting the lubrication path is formed, and a lid member main body which is formed with a fitting groove into which the lubrication path piece is adapted to be fitted. When lubricating oil is used as the lubricant, the lubrication path piece is fitted into the fitting groove in the lid member main body to narrow the lubrication path. On the other hand, when grease is used as the lubricant, the fitting groove in the lid member main body is used as the lubrication path without fitting the lubrication path piece into the fitting groove in the lid member main body.

CITATION LIST

Patent Literature

[Patent Literature 1] Japanese Patent No. 5160239

SUMMARY OF INVENTION

Technical Problem

As mentioned above, in the guide device, grease or lubricating oil may be used as lubricant. However, there is a great difference in viscosity between grease and lubricating oil. Specifically, the viscosity of grease is higher than that of lubricating oil. Therefore, in the configuration in which lubricant is supplied to the rolling element path through the lubrication path through which the lubricant flows, a lubrication path suitable for supplying grease and a lubrication path suitable for supplying lubricating oil are greatly different in cross-sectional area. In other words, when grease with high viscosity is used as lubricant, it is necessary to make the cross-sectional area of the lubrication path larger than when lubricating oil with low viscosity is used as lubricant.

Therefore, if lubricating oil is poured into the lubrication path suitable for supplying grease, the volume of the lubrication path is too large to fill it with the lubricating oil, and as a result, the lubricating oil may not be distributed throughout the entire rolling element path. On the other hand, even if grease is to be poured into the lubrication path suitable for supplying lubricating oil, the cross-sectional area of the lubrication path is too small, so that the grease does not enter the lubrication path, as a result of which the grease may not be supplied to the rolling element path.

Thus, in the guide device, it is difficult to use a common circulation path between the case where grease is used and the case where lubricating oil is used, as lubricant. Therefore, in the Patent Literature 1 described above, in the motion guide device, when lubricating oil is used as lubricant, the lubrication path piece is fitted into the fitting groove, but on the other hand, when grease is used as lubricant, the lubrication path piece is not fitted into the fitting groove, so that the structure of the lubrication path is made different according to the lubricant to be used. However, in the technique described in this Patent Literature 1, the structure of the motion guide device is changed according to the lubricant. Therefore, it is difficult to cope with a change of lubricant to be used after the motion guide device is installed as equipment.

The present invention has been made in view of the above problems, and it is an object of the present invention to provide a technique capable of coping with a change of lubricant to be used in a guide device in which a moving member moves relative to a track member.

Solution to Problem

A guide device according to the present invention comprises a track member extending along a longitudinal direction and a moving member relatively movable along the longitudinal direction of the track member, the moving member being engaged with the track member in such a manner that rolling surfaces formed on the track member and the moving member, respectively, are mutually opposed to each other, with a plurality of rolling elements rollably sandwiched between the rolling surfaces of the both members, the plurality of rolling elements circulating through a rolling element path when the moving member moves along the longitudinal direction of the track member, the rolling element path being formed of a loaded rolling path defined by the rolling surface of the track member and the rolling surface of the moving member, and a circulation path formed inside the moving member, wherein a lubrication path for supplying lubricant to the circulation path is formed in the moving member; the lubrication path comprises: a common path opening to an outer wall surface of the moving member and including an inlet portion serving as a supply port for the lubricant; a first path including a first communication portion in communication with the common path, and a first opening portion opening to a wall surface of the circulation path, the first path allowing grease to flow through when the grease is used as the lubricant; and a second path including a second communication portion in communication with the common path, and a second opening portion opening to the wall surface of the circulation path, the second path allowing lubricating oil to flow through when the lubricating oil is used as the lubricant; a cross-sectional area of the second path is smaller than the cross-sectional area of the first path, and in the common path, the second communication portion of the second path is located closer to the inlet portion than the first communication portion of the first path; and the guide device includes a plug member for blocking the inlet portion of the common path in the lubrication path, the plug member being removable and able to be moved inside the common path in a state of blocking the common path.

Advantageous Effects of Invention

According to the present invention, it is possible to cope with a change of lubricant used in a guide device where a moving member moves relative to a track member.

BRIEF DESCRIPTION OF DRAWINGS

FIG. 1 is a view illustrating an external appearance of a guide device according to an embodiment.

FIG. 2 is a view for explaining movement of rolling elements in the guide device.

FIG. 3 is a view illustrating a cross section of the guide device on a plane perpendicular to a rail extending direction.

FIG. 4 is a first view schematically illustrating an internal structure of an end plate.

FIG. 5 is a second view schematically illustrating an internal structure of the end plate.

FIG. 6 is a third view schematically illustrating an internal structure of the end plate.

FIG. 7 is a fourth view schematically illustrating an internal structure of the end plate.

FIG. 8 is a view for explaining the flow of grease in a lubrication path of the end plate.

FIG. 9 is a view for explaining the flow of lubricating oil in the lubrication path of the end plate.

FIG. 10 is a view for explaining the flow of grease in a lubrication path of an end plate in a modification.

MODE FOR CARRYING OUT THE INVENTION

In a guide device according to the present invention, a rolling element path in which a plurality of rolling elements circulate are formed by a loaded rolling path and a circulation path formed inside a moving member. Then, the moving member has a lubrication path formed therein to supply lubricant to the circulation path. This lubrication path is supplied with the lubricant from outside.

The lubrication path has a common path, a first path, and a second path. The common path includes an inlet portion which opens to the outer wall surface of the moving member and which serves as a supply port for the lubricant. In both the case of using grease as the lubricant and the case of using lubricating oil as the lubricant, the lubricant is poured into the common path from the outside through the inlet portion of the common path.

The first path is a path through which grease flows when the grease is used as the lubricant. The second path is a path through which lubricating oil flows when the lubricating oil is used as the lubricant. A first communication portion of the first path and a second communication portion of the second path are in communication with the common path, respectively. Also, a first opening portion of the first path and a second opening portion of the second path are opened in the wall surface of the circulation path, respectively. Therefore, the grease poured into the common path flows from the common path into the first path through the first communication portion, and is further supplied to the circulation path through the first opening portion. Also, the lubricating oil poured into the common path flows from the common path into the second path through the second communication portion, and is further supplied to the circulation path through the second opening portion.

Then, in the lubrication path, the cross-sectional area of the second path is formed smaller than the cross-sectional area of the first path. That is, the cross-sectional area of the first path is formed to have a size suitable for the grease to flow. On the other hand, the cross-sectional area of the second path is formed to have a size suitable for the lubricating oil to flow. In addition, in the common path, the second communication portion of the second path is located closer to an inlet portion side (i.e., an upstream side in the direction in which the lubricant flows) than the first communication portion of the first path.

Further, the guide device is provided with a plug member that blocks the inlet portion of the common path in the lubrication path. This plug member is configured such that it is removable and able to be moved within the common path in a state of blocking the common path. Therefore, when the plug member is removed from the inlet portion of the common path, the lubricant can be poured into the common path from the inlet portion. In addition, when the plug member is caused to move into the common path, it is possible to pour the lubricant only into that portion of the common path which is closer to the inlet portion side than the position of the plug member in the common path. In other words, it is possible to prevent the lubricant from flowing into the portion deeper than the position of the plug member in the common path.

In the guide device configured as described above, the lubricant to be used can be changed by removing the plug member from the inlet portion of the common path or by moving the plug member into the common path. That is, it becomes possible that when grease is used as the lubricant, the grease is supplied to the circulation path through the first path, whereas when lubricating oil is used as the lubricant, the lubricating oil is supplied to the circulation path through the second path.

For example, when grease is used as the lubricant, the plug member is removed from the inlet portion of the common path. This allows the grease to flow into the common path from its inlet portion. Then, the grease poured into the common path is supplied to the circulation path through the first path. At this time, in the common path, the grease passes through a portion thereof with which the second communication portion of the second path is in communication. However, the cross-sectional area of the second path is smaller than the cross-sectional area of the first path, and is formed to have a size suitable for the lubricating oil to flow. Therefore, it is possible to suppress the grease from flowing into the second path through the second communication portion. Note that in the moving member, each common path may be formed so as to extend deeper than the first communication portion of the first path. In such a case, when grease is used as the lubricant, the plug member may be arranged at a position deeper than the first communication portion of the first path in the common path.

On the other hand, when lubricating oil is used as the lubricant, the plug member is disposed at a position in the common path at which the first communication portion of the first path is in communication therewith, or at a position between the first communication portion of the first path and the second communication portion of the second path. Thus, the lubricating oil can be poured into the common path from its inlet portion. Then, the lubricating oil poured into the common path is supplied to the circulation path through the second path. At this time, the common path is blocked by the plug member at a position at which the first communication portion of the first path is in communication therewith and which is downstream of the second communication portion of the second path, or at a position between the first communication portion of the first path and the second communication portion of the second path. Therefore, it is possible to suppress the lubricating oil from flowing into the first path through the first communication portion.

In addition, as described above, in both cases where grease is used as the lubricant and where lubricating oil is used as the lubricant, in the guide device, the lubricant can be supplied from the inlet portion of the common path, which is a common supply port. Therefore, the space for providing a lubricant supply port can be reduced, in comparison with the case where a grease supply inlet portion and a lubricating oil supply inlet portion are separately provided on the outer wall surface of the moving member.

Hereinafter, specific embodiments of the present Invention will be described based on the accompanying drawings. The dimensions, materials, shapes, and, relative arrangements, and the like of component parts described in the embodiments are not intended to limit the technical scope of the invention to only those unless otherwise described.

<Configuration of Guide Device>

FIG. 1 illustrates the outer appearance of a guide device 1. The guide device 1 includes a rail 11 (corresponding to a "track member" in the present application), a carriage 12 (corresponding to a "moving member" in the present application) assembled to the rail 11 so as to be relatively movable along the longitudinal direction of the rail 11. The rail 11 is attached to a base of user equipment such as a machine tool, for example, and a table of the user equipment is attached to the carriage 12. In this case, the movement of movable parts including the table is guided by the guide device 1. Note that the guide device 1 can be turned upside down, with the carriage 12 attached to the base of the user equipment and the rail 11 attached to the table. Also, the guide device 1 may be used in a state in which the longitudinal direction of the rail 11 is not horizontal, but inclined or perpendicular to the horizontal plane.

Here, note that in the present description, for convenience of explanation, the configuration of the guide device 1 will be described on the assumption that the rail 11 is arranged on a horizontal plane, with the directions as viewed in the longitudinal direction of the rail 11 being set as follows: an x-axis shown in FIG. 1 is in the front to rear direction; a y-axis is in the vertical direction; and a z-axis is in the left to right direction. Of course, the arrangement of the guide device 1 is not limited to such an arrangement. In addition, FIG. 2 illustrates the motion of a plurality of rollers 15 (corresponding to "rolling elements" in the present application) in the guide device 1. FIG. 3 illustrates a cross section of the guide device 1 in a plane (y-z plane in FIG. 1) perpendicular to the direction of extension of the rail 11.

As illustrated in FIG. 3, on each of left and right rail side surfaces 11b of the rail 11, there are formed two upper and lower rolling surfaces 16b. That is, the rail 11 is formed with four rolling surfaces 16b. Also, as illustrated in FIG. 1, on a rail upper surface 11a of the rail 11, there are formed through holes 11c through which fastening members for fastening the rail 11 to the base of the user equipment are passed, at appropriate pitches along the longitudinal direction thereof.

The carriage 12 has a center portion facing the rail upper surface 11a of the rail 11 and a pair of side portions facing the side surfaces of the rail 11, and is U-shaped in cross section. Specifically, as illustrated in FIG. 1, the carriage 12 has a carriage main body 13 (corresponding to a "moving member main body" in the present application) in the center of the direction of movement, and a pair of end plates 14 (corresponding to "end members" in the present application) located at both ends in the direction of movement of the carriage main body 13. Then, as illustrated in FIG. 3, the carriage main body 13 has a center portion 13a facing the rail upper surface 11a of the rail 11, and a pair of side portions 13b facing the rail side surfaces 11b of the rail 11, and is U-shaped in cross section. Further, similarly to the carriage main body 13, the end plates 14 each also have a center portion facing the rail upper surface 11a of the rail 11, and a pair of side portions facing the rail side surfaces 11b of the rail 11, and is U-shaped in cross section. Each of the end plates 14 is fastened to the carriage main body 13 by fastening members such as bolts or the like. Note that the configuration of the end plates 14 will be described in detail later.

As illustrated in FIG. 3, the carriage main body 13 is formed with four rolling surfaces 16a facing the four rolling surfaces 16b of the rail 11, respectively. Then, the carriage main body 13 is engaged with the rail 11, with a plurality of rollers 15 being rollably held between the rolling surfaces 16b formed on the rail 11 and the rolling surfaces 16a formed on the carriage main body 13. Thus, loaded rolling paths 16 are defined by the rolling surfaces 16a of the rail 11 and the rolling surfaces 16b of the carriage main body 13, which are opposed to each other. In addition, as illustrated in FIG. 2, a return path 17 is formed in parallel with each loaded rolling path 16 inside the carriage main body 13. Also, the end plates 14 are each formed with U-shaped direction changing paths 18 that respectively connect the loaded rolling path 16 and the return path 17 with each other. The inner peripheral side of each direction changing path 18 is formed by an inner peripheral portion 19 which is integral with the carriage main body 13 and has a semi-circular cross section. Note that each return path 17 and each pair of direction changing paths 18 constitute a "circulation path" referred to in the present application. Thus, a track-shaped rolling element path 20 is formed by each loaded rolling path 16 between each rolling surface 16b of the rail 11 and each rolling surface 16a of the carriage main body 13, each pair of direction changing paths 18, and each return path 17. The plurality of rollers 15 are accommodated in each of the rolling element paths 20. Then, in the guide device 1, as illustrated in FIG. 2, when the carriage 12 moves relative to the rail 11 in a direction indicated by a white or outline arrow, the plurality of rollers 15 circulates in the direction of arrows while passing through each corresponding rolling element path 20. In other words, the rollers 15 between the mutually opposed rolling surfaces 16a, 16b roll on the loaded rolling paths 16. Further, the rollers 15, which have rolled to one end of each loaded rolling path 16, are introduced into one direction changing path 18, and return to the other end of the loaded rolling path 16 via the return path 17 and the other direction changing path 18.

<Configuration of Lubrication Path>

As described above, in the guide device 1, the plurality of rollers 15 circulate through each corresponding rolling element path 20 when the carriage 12 moves relative to the rail 11. At this time, the lubricant is supplied to each rolling element path 20 in order to suppress wear of the wall surfaces of the rolling element path 20 (i.e., the wall surfaces of the rolling surfaces 16a, 16b, the direction changing paths 18 and the return path 17) as well as wear of the rollers 15. This lubricant is supplied to the direction changing paths 18 via the lubrication path formed in the end plates 14.

Hereinafter, the configuration of the lubrication path in each of the end plates 14 will be described with reference to FIGS. 4 through 7. FIGS. 4 through 7 are views schematically illustrating the internal structure of an end plate 14. Here, in the guide device 1, grease (e.g., lithium-based grease or urea-based grease) or lubricating oil (e.g., sliding surface oil or turbine oil) is selectively used as the lubricant. Therefore, a lubrication path 30 in the end plate 14 has a first path 32 through which grease flows when the grease is used as the lubricant, and a second path 33 through which lubricating oil flows when the lubricating oil is used as the lubricant. Further, the lubrication path 30 has common paths 31 including inlet portions 31a, which serve as supply ports for the lubricant regardless of whether grease or lubricating oil is used as the lubricant.

Note that FIG. 4 mainly illustrates the schematic configuration of the common paths 31 and the first path 32. Also, FIG. 5 mainly illustrates the schematic configuration of the common paths 31 and the second path 33. However, the common paths 31 illustrated in FIG. 4 and the common paths 31 illustrated in FIG. 5 are the same. In addition, FIGS. 6 and 7 are enlarged views illustrating the schematic configurations of a communication portion of the first path 32 and a communication portion of the second path 33 in a common path 31.

As described above, the end plate 14 has a U-shaped cross section including a center portion 14a facing the rail upper surface 11a of the rail 11 and a pair of side portions 14b facing the rail side surfaces 11b of the rail 11. Then, as illustrated in FIGS. 4 and 5, in the end plate 14, a common path 31 of the lubrication path 30 is formed in each of the center portion 14a and the side portions 14b thereof (here, note that in FIGS. 4 and 5, each common path 31 is represented by a dashed line for the sake of convenience). The common path 31 formed in the center portion 14a includes an inlet portion 31a that opens to the outer wall surface on the front surface of the end plate 14 (i.e., the wall surface opposite to the wall surface that is in contact with the carriage main body 13). In addition, the common path 31 formed in each side portion 14b includes an inlet portion 31a that opens to the outer wall surface of a side surface of the end plate 14. That is, the end plate 14 is provided with three inlet portions 31a. Note that a nipple for connecting a grease gun for supplying grease or an oil supply pump for supplying lubricating oil can be attached to each inlet portion 31a.

In addition, a set screw 40 (corresponding to a "plug member" in the present application) for blocking each inlet portion 31a is provided in each common path 31 of the end plate 14. Each set screw 40 is configured such that it can be removed from the inlet portion 31a, and can be screwed into and moved in the depth direction in the common path 31 in a state of blocking the common path 31.

Moreover, the end plate 14 has the first path 32 and the second path 33 formed therein at positions shifted from each other in the front to rear direction (x-axis direction). Then, the first path 32 and the second path 33 are in communication with the individual common paths 31, respectively.

As illustrated in FIG. 4, the first path 32 is in communication with the common paths 31 formed in the both side portions 14b of the end plate 14, respectively. Note that in FIGS. 4 and 5, the communication portions of the first path 32 in communication with the common paths 31 formed in the both side portions 14b, respectively, are represented as first communication portions 32a. Then, in the end plate 14, the first path 32 extends from the both side portions 14b formed with the first communication portions 32a toward the center portion 14a, so that the first path 32 is in communication with the common path 31 formed in the center portion 14a substantially in the center of the center portion 14a. Further, the first path 32 extends from a first communication portion (not shown), which is in communication with the common path 31 formed in the center portion 14a of the end plate 14, to the direction changing paths 18 formed in the both side portions 14b of the end plate 14. Here, two direction changing paths 18 are respectively formed in each of the both side portions 14b of the end plate 14. Therefore, the first path 32 extending toward the both side portions 14b of the end plate 14 is bifurcated at each side portion 14b. Then, each of the bifurcated ends of the first path 32 is in communication with each of the two direction changing paths 18 in each side portion 14b. That is, the first path 32 is opened in the wall surface of each of the two direction changing paths 18 in each side portion 14b. Note that in FIG. 4, an opening portion of the first path 32 that opens in the wall surface of each direction changing path 18 is represented as a first opening portion 32b.

Further, as illustrated in FIG. 5, the second path 33 is in communication with of the common paths 31 formed in the both side portions 14b of the end plate 14, respectively, similarly to the first path 32. Note that in FIGS. 4 and 5, the communication portions of the second path 33 in communication with the common paths 31 formed in the both side portions 14b, respectively, are represented as second communication portions 33a. Then, in the end plate 14, the second path 33 extends from the both side portions 14b formed with the second communication portions 33a toward the center portion 14a, so that the second path 33 is in communication with the common path 31 formed in the center portion 14a substantially in the center of the center portion 14a. Moreover, the second path 33 extends from its portion, which is in communication with the common path 31 formed in the center portion 14a of the end plate 14, to the direction changing paths 18 formed in the both side portions 14b of the end plate 14. In addition, the second path 33 extending toward the both side portions 14b of the end plate 14 is bifurcated at each side portion 14b. Then, each of the bifurcated ends of the second path 33 is in communication with each of the two direction changing paths 18 in each side portion 14b. That is, the second path 33 is opened in the wall surface of each of the two direction changing paths 18 in each side portion 14b. Note that in FIG. 5, the opening of the second path 33 that opens in the wall surface of each direction changing path 18 is represented as a second opening portion 33b.

In addition, the first path 32 and the second path 33 have different cross-sectional areas (cross-sectional areas in the direction orthogonal to the axial directions of the paths, respectively). That is, the cross-sectional area of the first path 32 is formed to have a size suitable for the grease to flow. On the other hand, the cross-sectional area of the second path 33 is formed to have a size suitable for the lubricating oil to flow. Therefore, the cross-sectional area of the second path 33 is formed smaller than the cross-sectional area of the first path 32.

Here, the positional relationship between a communication portion 32a of the first path 32 and a communication portion 33a of the second path 33 in a common path 31 will be described with reference to FIG. 6 and FIG. 7. FIG. 6 illustrates a common path 31 formed in the center portion 14a of the end plate 14, a communication portion 32a of the first path 32, and a communication portion 33a of the second path 33. FIG. 7 illustrates a common path 31 formed in a side portion 14b of the end plate 14, a communication portion 32a of the first path 32, and a communication portion 33a of the second path 33. In FIG. 6, the upper side is the direction of the upper surface of the end plate 14. In FIG. 7, the upper side is the direction of the front of the end plate 14. FIGS. 6 and 7 illustrate a state in which the inlet portion 31a of the common path 31 is blocked by a set screw 40. As illustrated in FIGS. 6 and 7, the second path 33 is in communication with the middle portion of the common path 31 in both the center portion 14a and the side portion 14b of the end plate 14. In addition, in the central portion 14a of the end plate 14, the first path 32 is in communication with the deepest portion of the common path 31, as illustrated in FIG. 6. On the other hand, in the side portion 14b of the end plate 14, the first path 32 is in communication, from the side (from the front side of the end plate 14), with the vicinity of the deepest portion of the common path 31, as illustrated in FIG. 7. Then, as illustrated in FIGS. 6 and 7, in both the center portion 14a and the side portion 14b of the end plate 14, the second communication portion 33a of the second path 33 in the common path 31 is positioned closer to the inlet portion 31a than the first communication portion 32a of the first path 32 (i.e., positioned at the upstream side along the direction in which the lubricant flows).

<Flow of Lubricant>

Next, the flow of the lubricant in the lubrication path 30 of the end plate 14 when grease is used and when lubricating oil is used as the lubricant in the guide device 1 will be explained based on FIGS. 8 and 9. Here, the flow of the lubricant in the lubrication path 30 in the side portion 14b of the end plate 14 will be explained as an example.

FIG. 8 is a view for explaining the flow of grease in the lubrication path 30 of the end plate 14 when the grease is used as the lubricant in the guide device 1. In FIG. 8, an arrow represents the flow of grease. As illustrated in FIG. 8, when grease is used as the lubricant in the guide device 1, the set screw 40 is removed from the inlet portion 31a of the common path 31. Then, the grease is poured into the common path 31 from the inlet portion 31a of the common path 31. The grease poured into the common path 31 flows into the first path 32 through the first communication portion 32a. The grease that has flowed through the first path 32 is supplied to the direction changing path 18 through the first opening portion 32b.

At this time, in the common path 31, the grease passes through a portion thereof with which the second communication portion 33a of the second path 33 is in communication. However, the cross-sectional area of the second path 33 is smaller than the cross-sectional area of the first path 32, and is formed to have a size suitable for the lubricating oil to flow. Therefore, it is possible to suppress the grease from flowing into the second path 33 through the second communication portion 33a.

In addition, FIG. 9 is a view for explaining the flow of lubricating oil in the lubrication path 30 of the end plate 14 when the lubricating oil is used as the lubricant in the guide device 1. In FIG. 9, an arrow represents the flow of lubricating oil. As illustrated in FIG. 9, when lubricating oil is used as the lubricant in the guide device 1, the set screw 40 is screwed deep into the common path 31. Then, the set screw 40 is disposed at a position in the common path 31 where the first communication portion 32a of the first path 32 is in communication therewith. Thereafter, the lubricating oil is poured into the common path 31 from the inlet portion 31a thereof. The lubricating oil poured into the common path 31 flows into the second path 33 through the second communication portion 33a thereof. The lubricating oil after flowing through the second path 33 is supplied to the direction changing paths 18 through the second opening portions 33b.

At this time, the common path 31 is blocked by the set screw 40 at a position at which the first communication portion 32a of the first path 32 is in communication therewith and which is downstream of the second communication portion 33a of the second path 33. That is, the first communication portion 32a of the first path 32 is blocked by the set screw 40. Therefore, it is possible to suppress the lubricating oil from flowing into the first path 32 through the first communication portion 32a. Here, note that when lubricating oil is used as the lubricant in the guide device 1, the position at which the set screw 40 is disposed in the common path 31 is not limited to a position at which the first communication portion 32a of the first path 32 is in communication with the common path 31, but instead, it may be a position between the communication portion 32a of the first path 32 and the communication portion 33a of the second path 33. Even in the case where the common path 31 is blocked by the set screw 40 at such a position, it is possible to suppress the lubricating oil from flowing into the first path 32 through the first communication portion 32a. Note that in the center portion 14a of the end plate 14, too, by removing the set screw 40 from the inlet portion 31a of the common path 31, grease can be poured into the first path 32 from the common path 31, as in the case of FIG. 8. Also, in the center portion 14a of the end plate 14, the set screw 40 may be screwed and moved into the common path 31, so that it is disposed deeper than the second communication portion 33a of the second path 33, thereby allowing the lubricating oil to flow into the second path 33 from the common path 31, as in the case of FIG. 9.

<Advantageous Effects of Configuration of Guide Device>

As described above, in the guide device 1, it is possible to cope with a change of the lubricant to be used by removing a set screw 40 from the inlet portion 31a of a common path 31 or by screwing and moving the set screw 40 into the common path 31. That is, it becomes possible that when grease is used as the lubricant, the grease is supplied to the direction changing paths 18 through the first path 32, whereas when lubricating oil is used as the lubricant, the lubricating oil is supplied to the direction changing paths 18 through the second path 33. Therefore, the user of the guide device 1 can change the lubricant to be used even after the guide device 1 is installed as equipment.

In addition, as described above, in both cases where grease is used as the lubricant and where lubricating oil is used as the lubricant 1, in the guide device 1, the lubricant can be supplied from the inlet portion 31a of a common path 31, which is a common supply port. Therefore, the space for providing the lubricant supply port can be reduced, in comparison with the case where a grease supply inlet portion and a lubricating oil supply inlet portion are separately provided on the outer wall surface of each end plate 14.

Moreover, as described above, the common paths 31 are provided at three locations in each end plate 14. The inlet portions 31a of the common paths 31 are formed in the center portion 14a and the both side portions 14b of each end plate 14. That is, the inlet portions 31a are formed at three different positions in each end plate 14. Also, the guide device 1 includes three set screws 40 corresponding to the respective inlet portions 31a. Therefore, the user of the guide device 1 can select an inlet portion 31a to be used as a lubricant supply port from among the three inlet portions 31a according to the location of installation of the guide device 1. Note that, of the three inlet portions 31a of each end plate 14, those inlet portions 31a which are not selected as the lubricant supply port are blocked by the set screws 40. As a result, the lubricant is prevented from leaking to the outside from those inlet portions 31a which are not selected as the lubricant supply port.

Further, as a matter of course, the locations at which the inlet portions 31a are provided in each end plate 14 are not limited to three. For example, in each end plate 14, a common path including an inlet portion, which opens to the upper surface of the center portion 14a, may be provided in addition to the three locations shown in FIGS. 4 and 5. Also, in each end plate 14, there may be only one location at which a common passage including an inlet portion is provided.

(Modification)

FIG. 10 is an enlarged view illustrating the schematic configuration of the communication portion of the first path 32 and the communication portion of the second path 33 in the common path 31 according to a modification of the present embodiment. In addition, in FIG. 10, an arrow represents the flow of grease. As illustrated in FIG. 10, in this modification, the end plate 14 is configured such that the common path 31 is formed so as to extend deeper than the first communication portion 32a of the first path 32.

Thus, in the case of the configuration of this modification, when grease is used as lubricant in the guide device 1, the set screw 40 may not be removed but may be screwed into a location in the common path 31 deeper than the first communication portion 32a of the first path 32. That is, as illustrated in FIG. 10, the set screw 40 may be disposed at the location deeper than the first communication portion 32a of the first path 32 in the common path 31. In this case, too, the grease poured into the common path 31 can flow into the first path 32 through the first communication portion 32a. Then, the grease that has flowed through the first path 32 is supplied to the direction changing paths 18 through the first opening portions 32b. Here, note that even in this case, the grease is prevented from flowing into the second path 33 through the second communication portion 33a.

REFERENCE SIGNS LIST

1 . . . guide device, 11 . . . rail, 11a . . . rail upper surface, 11b . . . rail side surface, 12 . . . carriage, 13 . . . carriage main body, 13a . . . center portion, 13b . . . side portion, 14 . . . end plate, 14a . . . center portion, 14b . . . side portion, 15 . . . roller, 16 . . . loaded rolling path, 16a . . . rolling surface, 16b . . . rolling surface, 17 . . . return path, 18 . . . direction changing path, 20 . . . rolling element path, 30 . . . lubrication path, 31 . . . common path, 31a . . . inlet portion, 32 . . . first path, 32a . . . first communication portion, 32b . . . first opening portion, 33 . . . second path, 33a . . . second communication portion, 33b . . . second opening portion, 40 . . . set screw.

The invention claimed is:

1. A guide device comprising: a track member extending along a longitudinal direction; and a moving member relatively movable along the longitudinal direction of the track member, the moving member being engaged with the track member in such a manner that rolling surfaces formed on the track member and the moving member, respectively, are mutually opposed to each other, with a plurality of rolling elements rollably sandwiched between the rolling surfaces of the both members, the plurality of rolling elements circulating through a rolling element path when the moving member moves along the longitudinal direction of the track member, the rolling element path being formed of a loaded rolling path defined by the rolling surface of the track member and the rolling surface of the moving member, and a circulation path formed inside the moving member, wherein a lubrication path for supplying lubricant to the circulation path is formed in the moving member;

the lubrication path comprises:

a common path opening to an outer wall surface of the moving member and including an inlet portion serving as a supply port for the lubricant;

a first path including a first communication portion in communication with the common path, and a first opening portion opening to a wall surface of the circulation path, the first path allowing grease to flow through when the grease is used as the lubricant; and a second path including a second communication portion in communication with the common path, and a second opening portion opening to the wall surface of the circulation path, the second path allowing lubricating oil to flow through when the lubricating oil is used as the lubricant;

a cross-sectional area of the second path is smaller than the cross-sectional area of the first path, and in the common path, the second communication portion of the second path is located closer to the inlet portion than the first communication portion of the first path; and the guide device includes a plug member removably blocking the inlet portion of the common path in the lubrication path, the plug member being removable from the inlet portion to open the inlet portion, and the plug member being configured to be moved inside of the common path to block the communication of the common path with the first communication portion.

2. The guide device according to claim 1, wherein when the grease is used as the lubricant, the plug member is removed; and when the lubricating oil is used as the lubricant, the plug member is disposed in the common path at a position at which the first communication portion of the first path is in communication therewith, or at a position between the first communication portion of the first path and the second communication portion of the second path.

3. The guide device according to claim 2, wherein in the moving member, the common path is formed so as to extend toward an inner side of the moving member beyond a location where the first communication portion of the first path is communicated with the common path; and when the grease is used as the lubricant, the plug member is removed or disposed at an inner position beyond the location where the first communication portion of the first path is communicated with the common path.

4. The guide device according to claim 1, wherein
the lubrication path comprises a plurality of the common paths;
the inlet portions of the respective common paths are formed at different positions in the moving member;
the first path and the second path are in communication with each of the common paths; and
the guide device includes a plurality of the plug members corresponding to the respective common paths.

5. The guide device according to claim 1, wherein
the moving member comprises a moving member main body in which the rolling surface is formed, and a pair of end members arranged at both ends in the moving direction of the moving member;
the circulation path is configured to comprise a return path formed in the moving member main body in parallel with the loaded rolling path, and a direction changing path formed in each of the end members in a U shape so as to connect the loaded rolling path and the return path; and
the lubrication path is formed in each of the end members.

* * * * *